United States Patent [19]
Vitale

[11] Patent Number: 5,228,293
[45] Date of Patent: Jul. 20, 1993

[54] LOW TEMPERATURE SOLAR-TO-ELECTRIC POWER CONVERSION SYSTEM

[75] Inventor: Nicholas G. Vitale, Watervliet, N.Y.

[73] Assignee: Mechanical Technology Inc., Latham, N.Y.

[21] Appl. No.: 908,477

[22] Filed: Jul. 6, 1992

[51] Int. Cl.$^5$ .................................................. F03G 6/00
[52] U.S. Cl. .................................. 60/641.14; 60/517; 60/641.15; 60/676
[58] Field of Search ............ 60/641.8, 641.15, 641.14, 60/517, 676

[56] References Cited

U.S. PATENT DOCUMENTS

| | | | |
|---|---|---|---|
| 659,450 | 10/1900 | McHenry | 60/641.8 |
| 4,010,614 | 3/1977 | Arthur | 60/641.15 |
| 4,335,578 | 6/1982 | Osborn et al. | 60/641.8 |
| 4,586,334 | 5/1986 | Nilsson, Sr. et al. | 60/641.8 X |
| 4,707,990 | 11/1987 | Meijer | 60/641.15 |

Primary Examiner—Stephen F. Husar
Attorney, Agent, or Firm—Kane, Dalsimer, Sullivan, Kurucz, Levy, Eisele and Richard

[57] ABSTRACT

The apparatus is a low-temperature solar to electric power conversion system. A solar collector directs solar insolation to a cavity receiver which heats primary thermal transport fluid to approximately 700° F. An auxiliary fossil or biomass heater may be used to replace or supplement the solar-powered cavity receiver. The primary thermal transport fluid is provided to a Stirling engine which provides electric power and hot water heated to approximately 160° F.

7 Claims, 2 Drawing Sheets

LOW TEMPERATURE SOLAR-TO-ELECTRIC POWER CONVERSION SYSTEM

BACKGROUND OF THE INVENTION

1. Field of the Invention

This invention pertains to a low temperature (approximately 700° F. head temperature) Stirling engine driven by a solar powered apparatus.

2. Description of the Prior Art

The societal need for renewable, non-polluting sources of energy, particularly electrical energy suitable for distribution by conventional power lines, has become obvious in the face of increased environmental concerns regarding global warming, acid rain and nuclear fuel disposal and increased economic concerns regarding the high cost of energy production, not to mention the long lead times required to build a conventional large-scale power plant in the face of mounting regulatory obstacles.

While small-scale production of electricity by renewable means (such as solar) is desirable in many respects, fundamental thermodynamic constraints on the attainable energy conversion efficiency have tended to make small-scale low-temperature heat source applications impractical. However, high-temperature heat source applications have been difficult to maintain, particularly if the thermal transfer fluid was a liquid metal such as sodium or potassium which, while having the distinctive thermal advantage of a low Prandtl number, is highly reactive with water and has a tendency to leach alloying materials from the hot loop surfaces and deposit them at the cold loop surfaces.

More particularly, in solar applications, the use of a high heater head temperature (typically 1300° F. in the past) to achieve high cycle efficiency has necessitated a small aperture solar energy receiver (to minimize aperture radiation losses) and, consequently, a collector with a high concentration ratio and very accurate contour control; a heat-pipe-type thermal transport subsystem to avoid hot spots on the already high temperature head; the use of liquid metal heat pipe transfer media (typically potassium-sodium mixtures) to achieve proper heat-pipe-type operation at the temperature of interest; superalloy materials in the engine-alternator heater head (due to concerns of the creep strength of the material at the operating temperature, its yield strength at both high and low temperatures, and its ability to resist high and low cycle fatigue); and the use of helium rather than hydrogen as a Stirling-cycle working fluid due to the high-temperature permeation of hydrogen through the heater head into the heat pipe system. These requirements adversely impacted the manufacturing cost and performance of the system.

Moreover, a substantial drawback to solar-to-electrical energy conversion has been the unavailability of sunlight during either nighttime or inclement weather.

OBJECTS AND SUMMARY OF THE INVENTION

It is therefore an object of this invention to provide a low-temperature heat source solar-to-electric power conversion system which is practical in view of fundamental thermodynamic constraints.

It is therefore a further object of this invention to provide a low-temperature heat source solar-to-electric power conversion system which avoids the complexity required by the use of liquid metal thermal transfer fluids.

It is therefore a still further object of this invention to provide a low-temperature heat source solar-to-electric power conversion system which includes an auxiliary heat source for off-sun periods.

The apparatus of this invention is a low temperature (approximately 700° F. head temperature) solar-to-electric power conversion system which includes a solar collector, a cavity receiver, a pumped-loop thermal transport system, a Stirling engine (which includes a low-temperature Stirling thermodynamic cycle, a mechanical drive and an alternator), power conditioning and controls, and a heat rejection coolant loop.

The solar collector receives incident solar radiation and focuses the energy into the cavity receiver. The cavity receiver accepts the solar radiation and heats a thermal transfer fluid in the thermal transport system. The pumped-loop thermal transport subsystem transfers heats to the Stirling cycle engine, which can be located away from the focal point of the solar collector. The Stirling cycle and associated mechanical drive and alternator convert the thermal energy into electrical energy. The power conditioning and controls provide the electrical energy to the user (either stand-alone or to the grid). The engine also rejects heat to a coolant loop and radiator.

An optional auxiliary fossil or biomass burner may be added to the system to heat the fluid in the thermal transport system to either supplement the solar radiation or provide for operation at night. Additionally, heat rejected from the engine through the coolant loop may provide hot water for heating or for other thermal applications. The expected overall performance of a system using a 700° F. hot-side temperature Stirling engine that rejects its heat at 160° F. is 26.5% (useful electrical energy to the user divided by energy to the receiver). This estimate does not include possible energy recovery in the engine coolant loop.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
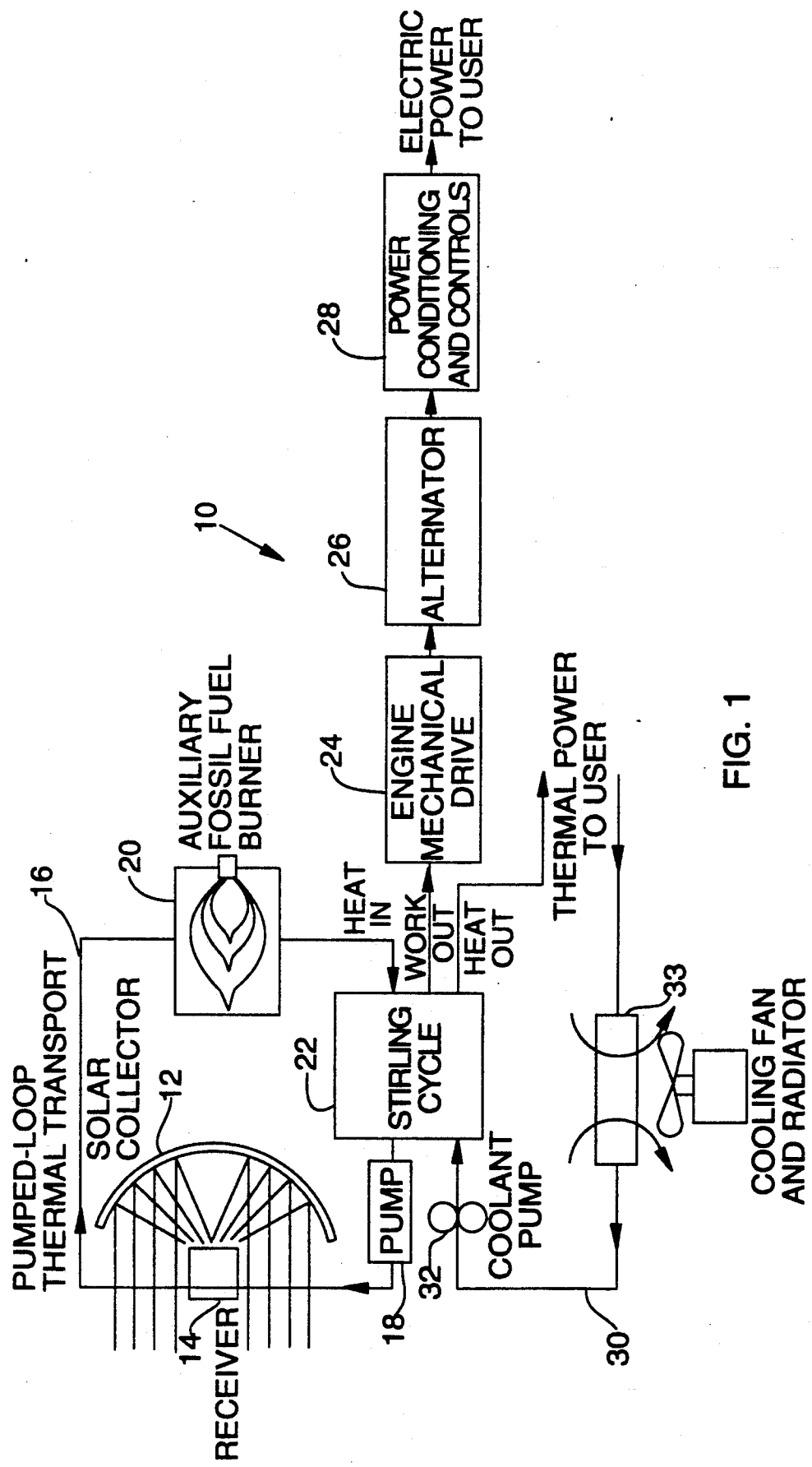
FIG. 1 is a block diagram of the system of the present invention.

Referring now to the drawings in detail wherein like numerals refer to like elements throughout the several views, FIG. 1 is a schematic of the apparatus 10 of the present invention.

Apparatus 10 includes solar collector 12 which reflects and focuses solar radiation to cavity receiver 14. Cavity receiver 14 receives thermal fluid through primary thermal transport loop 16 from pump 18 and heats the thermal fluid using the concentrated solar radiation from solar collector 12. Thermal fluid leaves cavity receiver 14 through primary thermal transport loop 16 to auxiliary fossil fuel burner 20 which may be used during inclement weather or at night. Thermal fluid, heated to approximately 700° F. in primary thermal transport loop 16 by either cavity receiver 14 and/or auxiliary fossil fuel burner 20, is provided to Stirling cycle engine 22 which provides mechanical work to engine mechanical drive 24, alternator 26, and power conditioning and controls 28 thereby providing electrical energy to either a stand-alone user or an electrical utility power grid.

Meanwhile, in secondary loop 30, water or a similar liquid is pumped by coolant pump 32 through Stirling cycle engine 22 to transport the rejected waste heat away from Stirling cycle engine 22. This rejected waste heat typically heats the water in secondary thermal loop 30 to approximately 160° F. thereby allowing the secondary loop water to be used for heating or similar purposes. Upon its return, if the secondary loop water is not sufficiently cooled to attain the desired Carnot efficiency of the Stirling cycle engine 22, cooling fan and radiator 33 are used to cool the secondary loop water before it is pumped again to Stirling cycle engine 22.

The expected overall performance of apparatus 10 using a 700° F. hot-side temperature Stirling engine that rejects its heat is 26.5% (useful electric energy to the user divided by energy to receiver 14). This calculation does not account for possible energy recovery in the engine coolant loop.

Figure 2:
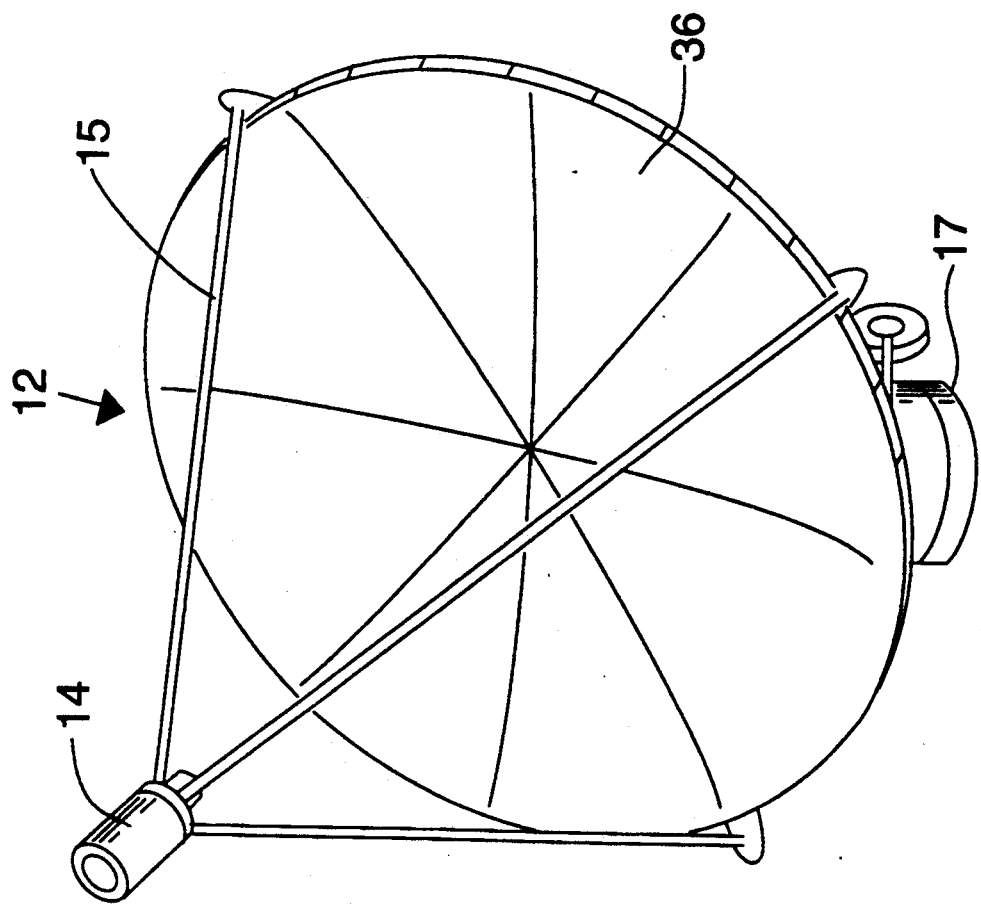
FIG. 2 is a perspective view of a single stretched membrane dish of a solar collector of the present invention.

Referring to FIGS. 1 and 2, solar collector 12 intercepts the incident solar radiation, concentrates it and directs it to the aperture 34 (see FIG. 3) of cavity receiver 14. As solar collector 12 and cavity receiver 14 typically represent half of the cost of apparatus 10, improved cost efficiencies in this area promise a reduced cost for the produced electrical energy.

Preferably, collector 12 is comprised of a stretched membrane 36 which offers simplicity, high performance, low cost, and light weight. Stretched membrane 36 is a thin, flexible sheet of highly reflective material (e.g., silvered plastic film) stretched over circular hoop 38. Suction applied behind membrane 36 causes membrane 36 to deflect into a spherical shape suitable for use as a low-concentration-ratio point-focusing-type collector.

For a given diameter of collector 12 (i.e., a given amount of intercepted solar energy), increasing the amount of evacuation increases the skin curvature, resulting in a shorter focal length for collector 12. A shorter focal length simplifies the support 15 for cavity receiver 14. As the curvature of membrane 36 is increased, the deviation of the surface from the ideal paraboloid shape increases, and the maximum concentration ratio of collector 12 decreases. An important advantage of a lower heater head temperature is the ability of receiver 14 to interface efficiently with a lower concentration ratio collector 12. Consequently, for a given focal length, the diameter of collector 12 can be increased with only the mass penalty associated with the additional surface area and not the mass penalty associated with increased focal length. Alternatively, if the reduced concentration ratio requirement is used to increase diameter and decrease focal length simultaneously, it is possible to obtain an increased collector size with no net weight penalty.

Pedestal 17 of collector 12 includes a clock-based sun tracking means to maintain the proper orientation of collector 12 with regard to the sun throughout the day and the seasons.

Figure 3:
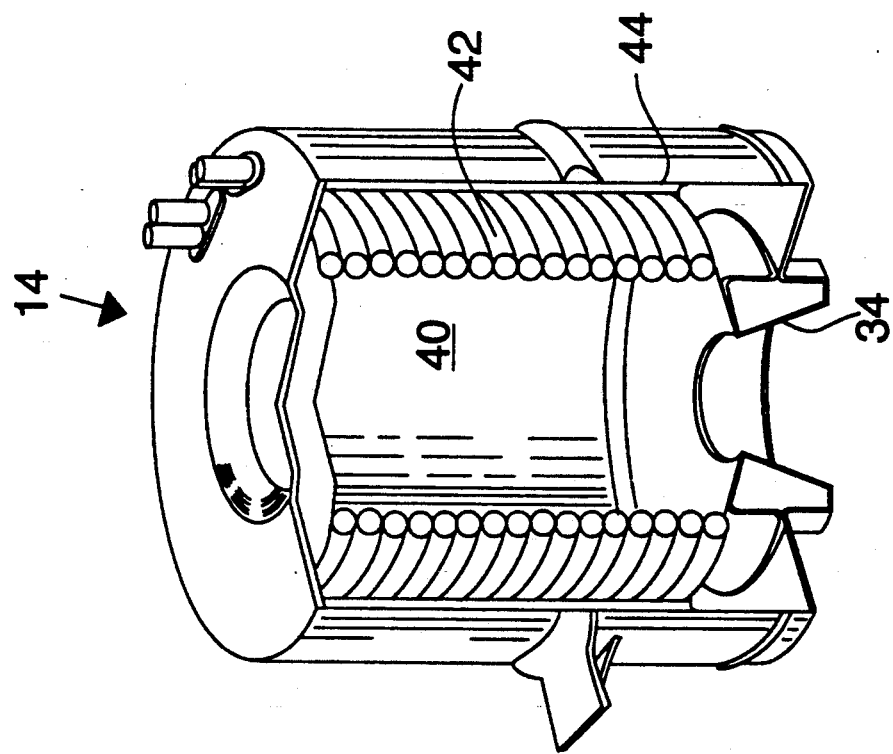
FIG. 3 is a perspective view of the cavity receiver of the present invention.

Referring to FIG. 3, the function of cavity receiver 14 is to accept the concentrated solar radiation from solar collector 12 and convert it into thermal energy for use by the remainder of apparatus 10. Cavity receiver 14 typically includes windowless aperture 34 into which solar radiation enters. The solar radiation is converted to sensible thermal energy at cavity walls 40 and transported by primary loop fluid within coils 42 concentric with cavity walls 40. Shell insulation layer 44 is placed outwardly adjacent from coils 42 to reduce shell loss (i.e., thermal loss from the hot inside surface of the receiver through the shell insulation layer 44 to the surrounding ambient air).

The use of a lower head temperature (e.g., 700° rather than 1400° F.) reduces shell loss, cavity reradiation (the thermal loss due to reradiation from the hot internal walls 40 through aperture 34, which, to the first order, is proportional to the cavity temperature to the fourth power) and transient start-up losses (i.e., the loss in thermal energy required to bring receiver 14 to operating temperature, this loss tends to be proportional to cavity temperature) of the cavity receiver 14. Cavity convection (i.e., the free air convection through aperture 34 of cavity receiver 14) tends to decrease with lower head temperature, due to both the volume of convected air and the amount of energy lost per unit of convected air. However, the use of a larger aperture 34 at low temperature tends to increase the free convection rate and increase the energy loss.

Primary thermal transport loop 16 transfers the sensible energy generated in cavity receiver 14 (and/or auxiliary fossil fuel burner 20) to the engine heater head of Stirling cycle engine 22. Primary thermal transport loop 16 could be a pumped liquid loop using a heat transfer fluid, molten salt or liquid metal; a recirculating pressurized gas loop; or an evaporation-condensation system such as a heat pipe (liquid return by wick), a pool boiler (liquid return by gravity) or a reflux boiler (liquid return by mechanical pump). For the instant implementation with a 700° F. heater head temperature, a pumped liquid loop using commercial heat transfer fluid (e.g., thermally stabilized silicone polymer, such as Monsanto's Syltherm 800 ®) is preferred.

Stirling cycle engine 22 engine is a heat engine. Unlike internal combustion engines, Stirling cycle engine 22 has a working fluid (usually helium or hydrogen) contained within the engine. When the working fluid is heated, the working fluid expands thereby pushing a piston. The piston motion is then translated to output power either by engine mechanical drive 24 which drives alternator 26 which, in turn, generates electrical power. Alternately, in the case of a free-piston engine, the piston motion is translated to expanding gas forces to a free-piston alternator assembly. Once the piston has gone through an expansion stroke, the working fluid is passed through three heat exchangers (not shown)—the heater, regenerator, and cooler. The heater supplies heat energy to the working fluid. The regenerator stores the heat energy supplied by the heater. The cooler removes the heat from the working fluid and rejects the excess to a secondary thermal loop 30. The cooled working fluid is then compressed, passed through the regenerator to preheat the gas prior to being heated, and expanded in the heater.

The cycle efficiency of Stirling cycle engine 22 can be considered as the product of the two efficiencies as follows:

$$\eta_{cycle} = \eta_{Carnot} * \eta_{pneumatic}$$

where $\eta_{Carnot}$ is the Carnot efficiency and $\eta_{pneumatic}$ is the percent of the Carnot efficiency achieved in the cycle design.

The (ideal) Carnot efficiency is based only on the ratio of the engine heater head temperature $T_h$, to the engine cooler temperature $T_c$, wherein both $T_h$ and $T_c$ are expressed in absolute temperatures. As the Carnot efficiency is considered a fundamental upper limit, it does not depend upon the details of the engine design. The expression for the Carnot efficiency is:

$$\eta_{Carnot} = (T_h - T_c)/T_h$$

For real engine systems, the Carnot efficiency can never be made equal to one, but high values of Carnot efficiencies can be achieved by making the heat rejection temperature low and the heater head temperature high.

On the other hand, the pneumatic efficiency depends on the specifics of the cycle design, as well as the temperature ratio. Although always less than 1.0, the pneumatic efficiency of existing cycle designs tends to vary with temperature ratio. It is low at low temperature ratios and it increases with increasing temperature ratio to some maximum value beyond which it decreases with further increases in temperature ratio. With past Stirling design technology, the falloff in efficiencies below a temperature ratio of 2.0 has been fairly steep.

The present apparatus 10 is particularly advantageous in that a cycle efficiency of approximately 36% can be achieved with an engine operating at a 700° F. hot side and a 160° F. heat reject temperature.

In the present apparatus 10, the "sink" for reject heat is the atmosphere, and the extent to which the cooler temperature can be lowered is limited by the ambient temperature and the size and cost of the cooling system (i.e., cooling fan and radiator 33). As the cooler temperature approaches the ambient air temperature, the size of the cooling system grows exponentially, and cost considerations quickly prevent temperature reductions beyond a certain point.

The remaining major system components—the engine mechanical drive 24, the alternator 26, the power conditioning and controls system 28, and the secondary thermal loop 30—are less affected by the heater head temperature than are the front-end components discussed above. However, advances in these systems aid in achieving a desirable economic cost of the produced electricity as described herein.

Engine mechanical drive 24 for the Stirling cycle has two primary objectives. First, it generates the volume variations in the cycle expansion and compression spaces for proper cycle operation. Second, it converts the pneumatic power generated in the cycle working fluid to mechanical power and transmits it to the engine load.

Engine mechanical drive 24 may be either kinematic wherein the motions of the pistons are rigidly constrained by a suitably configured crank system or free-piston wherein the motions of the pistons are not rigidly constrained and are achieved more subtly by the interaction of spring and damper elements with the engine piston masses.

Each drive system has its advantages and disadvantages. The kinematic engine is easier to control in the face of rapidly varying loads and provides higher efficiency when shaft power rather than direct electrical power is required. However, it normally uses piston ring seals and hence requires periodic maintenance for seal replacement. The free-piston engine typically uses noncontacting seals and bearings and therefore has the potential for many tens of thousands of hours of operation without maintenance. However, because of the difficulties inherent in the control of apparatus 10, it is best used in applications characterized by a relatively constant load. Free-piston drives are preferred for systems intended to provide electric power to the utility grid (i.e., electric output and small load variations). The kinematic drive is preferred when the system is to be operated separately from the grid, primarily because of the rapid load variations that typically occur in this mode of operation. The kinematic drive disclosed in U.S. patent application Ser. No. 694,370, filed May 1, 1991, is illustrative of engine mechanical drive 24 preferred in apparatus 10 for such applications.

Kinematic drives for small engine systems can be made very simple and compact by using grease-packed bearings and dry-lubricated (polytetrafluoroethylene, or Teflon ®-type) wear pads and piston rings.

Power conditioning and controls system 28 is an important design consideration in kinematic drives. However, the operational differences between solar and fossil fuel energy sources can be used to significant advantage to simplify the design of power conditioning and controls system 28. In fossil fuel systems, a major requirement of power conditioning and controls system 28 is to reduce fuel consumption during periods of low load. This typically requires the use of complex mean pressure or variable engine stroke controls. In apparatus 10, the solar supply is freely available independent of the load. Consequently, a major requirement of power conditioning and controls system 28 is to prevent overspeed at low load conditions. A mechanically simple parasitic power dissipation control, such as a variable orifice valve between the engine working and bounce space, can be used to manage power output.

When the solar insolation is insufficient to drive the load (either because the insolation is too low or the load is too high), the engine shaft speed is maintained by reducing the alternator field current and by allowing the alternator voltage to drop. Many operational strategies can be postulated for a system employing voltage drop to maintain the system power balance. For example, specific loads can be dropped off-line at predetermined voltage points or apparatus 10 can simply drop off-line below a predetermined voltage, or suitable visual or audible alarms can be used to alert the user to the need to reduce load.

To use apparatus 10, the user points solar collector 12 toward the sun (a mechanical clock-type drive within pedestal 17 is used to maintain solar collector at the proper orientation throughout the day); actuates pumps 18 and 32 of the primary and secondary thermal transport loops 16, 30; and activates cooling fan and radiator 33. Optionally, the user may activate auxiliary fossil fuel burner 20. The user then receives electrical power from power conditioning and controls system 28 as generated by alternator 26 and hot water from secondary thermal transport loop 30.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An electric power generating apparatus, including:
   a solar collector;
   a primary thermal loop including primary thermal fluid;
   a cavity receiver to receive reflected solar energy from said solar reflector, convert said solar energy into thermal energy, and transmit said thermal energy to said primary thermal fluid by heating said primary thermal fluid not to exceed a given temperature, said given temperature being substantially equal to 700° F.;
   a Stirling engine receiving said primary thermal fluid heated by said cavity receiver, including means to generate mechanical power and means to generate electrical power from said means to generate mechanical power.

2. The electrical power generating apparatus of claim 1 wherein said Stirling engine includes a secondary loop which provides heated water from said Stirling engine.

3. The electrical power generating apparatus of claim 2 wherein said heated water is substantially 160° F.

4. The electrical power generating apparatus of claim 2 wherein said solar collector includes a stretched membrane.

5. The solar power generating apparatus of claim 2 wherein said primary thermal fluid is a thermally stabilized silicone polymer.

6. The electrical power generating apparatus of claim 1 further including an auxiliary heat source means within said primary thermal loop for heating said primary thermal fluid.

7. The electrical power generating apparatus of claim 6 wherein said auxiliary heat source means includes a fossil fuel burning means.

* * * * *